Feb. 26, 1929.　　　　　　　　　　　　　　　　　　　　　1,703,302
C. A. DUNHAM
TEMPERATURE INDICATOR FOR INTERNAL COMBUSTION ENGINES
Filed Nov. 5, 1923　　　3 Sheets-Sheet 1
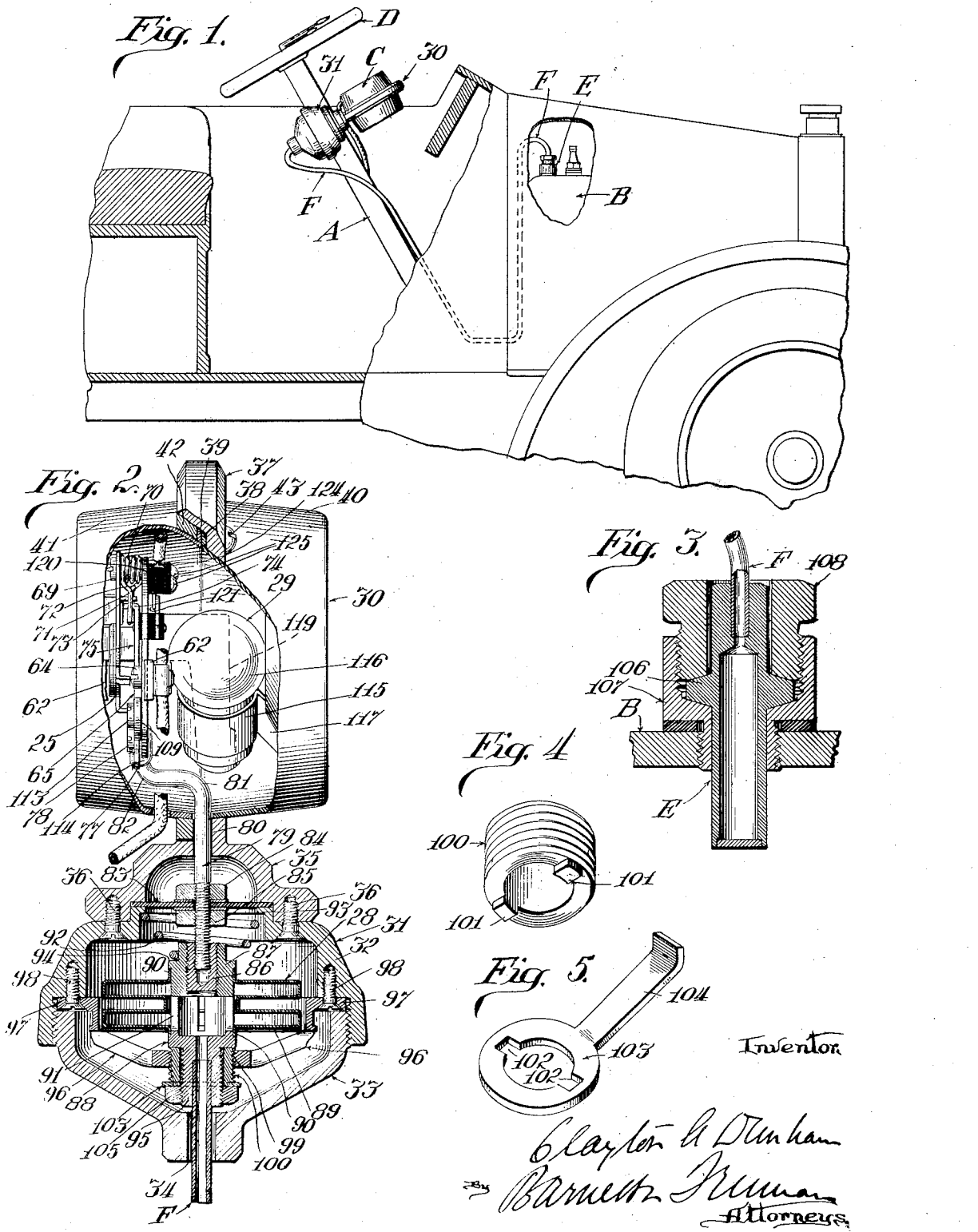

Feb. 26, 1929.  1,703,302
C. A. DUNHAM
TEMPERATURE INDICATOR FOR INTERNAL COMBUSTION ENGINES
Filed Nov. 5, 1923    3 Sheets-Sheet 2
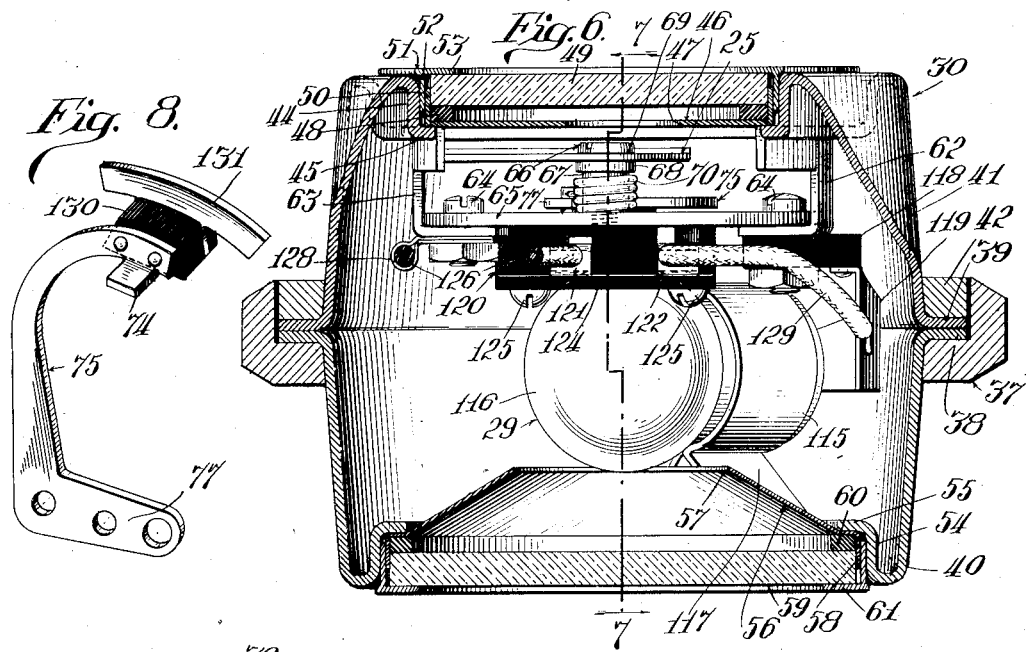
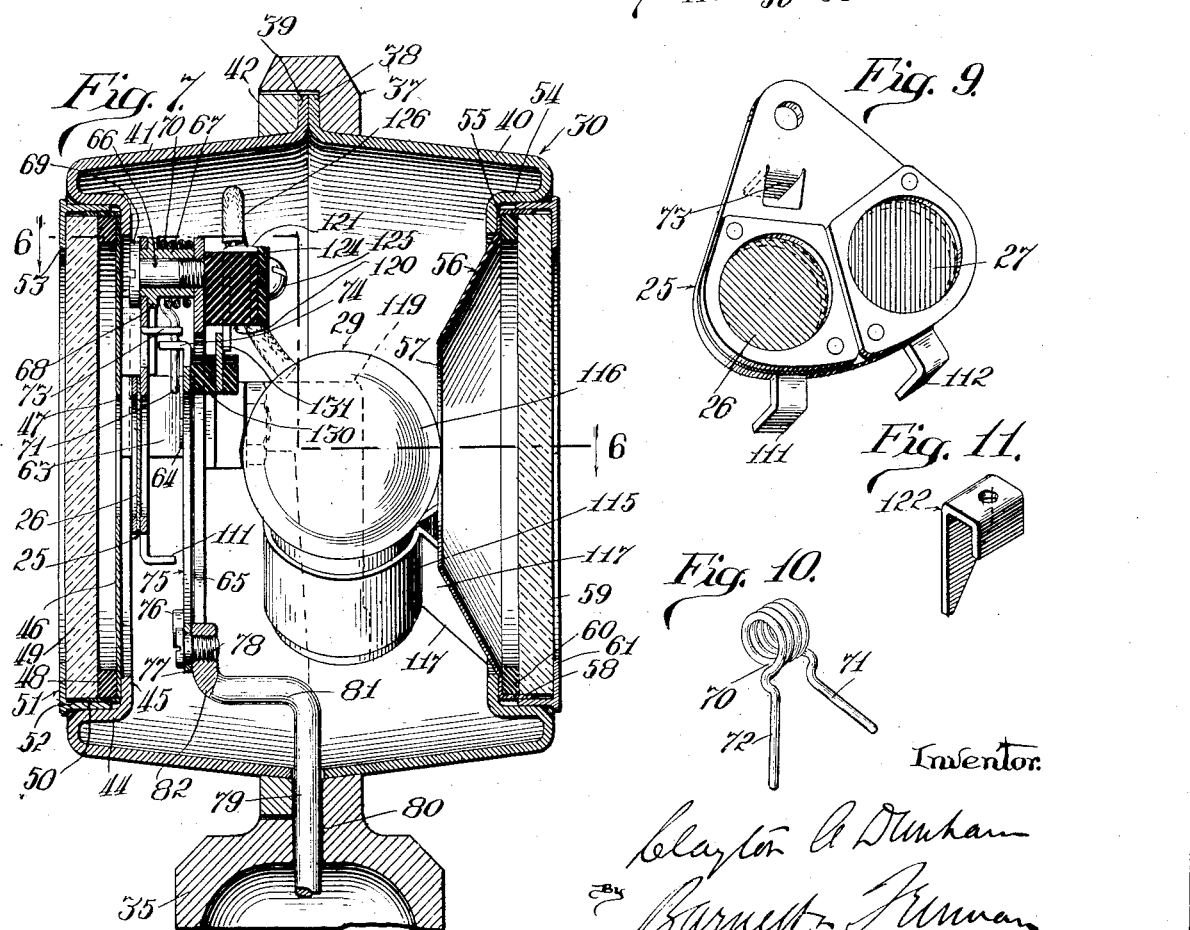
Inventor
Clayton A. Dunham
By Barnett Funnan
Attorneys

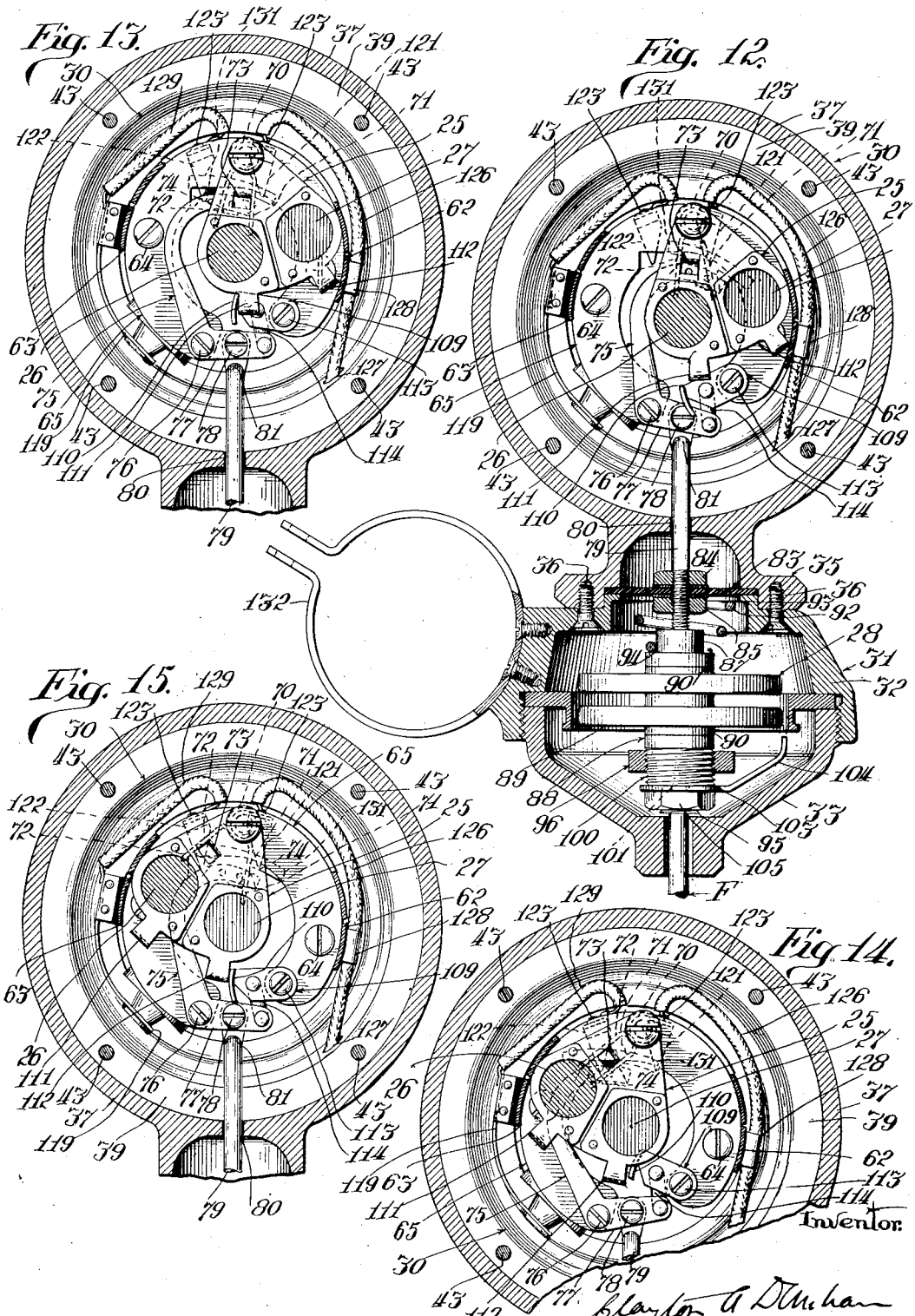

Patented Feb. 26, 1929.

1,703,302

UNITED STATES PATENT OFFICE.

CLAYTON A. DUNHAM, OF GLENCOE, ILLINOIS, ASSIGNOR, BY MESNE ASSIGNMENTS, TO C. A. DUNHAM COMPANY, OF MARSHALLTOWN, IOWA, A CORPORATION OF IOWA.

TEMPERATURE INDICATOR FOR INTERNAL-COMBUSTION ENGINES.

Application filed November 5, 1923. Serial No. 672,957.

My invention relates to a device for indicating the operating temperatures of water cooled internal combustion motors, on automobiles for example, in order that the driver may be kept advised as to whether or not the motor is operating at the normal running temperature.

One of the objects of the invention is to provide a device the indicating instrument of which may be attached to the steering column of an automobile, for example, so as to be directly under the eye of the driver.

Another object is to provide a new and improved motor temperature indicating device which is responsive directly to temperature changes in the cooling fluid in the water jacketed space of the motor, this arrangement giving a better and more accurate indication of working conditions of the motor than where the heat responsive element is arranged in the radiator associated with the motor.

A further object is to provide means whereby the device may be readily adjusted to act at different temperatures, this feature adapting the instrument to motors the normal working temperatures of which may not be the same.

A further object is to construct an indicating device, the indicating means of which employs an electric lamp so that light from this lamp will be utilized for illuminating the portion of the car under the cowl or dashboard. It is a matter of considerable convenience to provide for this illumination, this portion of the car which contains the control pedals and the starting button.

Certain of the operating mechanisms herein shown and described are in some respect similar to the mechanisms employed in the temperature indicating device shown in my co-pending application Serial No. 604,813. In respect to these mechanisms my object has been to make certain improvements in the construction of the parts which may be utilized in either one or the other type of indicating mechanism.

The invention is illustrated, in a preferred embodiment, in the accompanying drawings, wherein Fig. 1 is a fragmentary, side elevation, with parts in section, of the forward end of an automobile showing the indicating device of my invention applied to the steering column.

Fig. 2 is a side elevation of the indicating device with part of the upper casing broken away to show the mechanism within and the lower portion of the device shown in longitudinal section.

Fig. 3 is a sectional view of the cell or capsule containing the expansive fluid employed for actuating the indicating mechanism, this device being shown as secured to the cylinder block so as to project into the water space thereof.

Figs. 4 and 5 are detail views, in perspective, of parts of the device employed for adjusting the expansion element so as to vary its response to internal pressures.

Fig. 6 is a sectional view on line 6—6 of Fig. 7.

Fig. 7 is a vertical sectional view on line 7—7 of Fig. 6.

Fig. 8 is a view, in perspective, of the rocking member forming part of the indicating mechanism.

Fig. 9 is a similar view of the indicating member.

Fig. 10 is a view, in perspective, of the spring which effects the movements of the indicating member.

Fig. 11 is a similar view of the fixed member of the circuit breaker for controlling current to the lamp by which the indicating mechanism is illuminated.

Fig. 12 is a longitudinal sectional view through the instrument showing the parts of the indicating mechanism in the positions which they occupy when the motor is cold, and Figs. 13, 14 and 15 are views corresponding to the upper portion of Fig. 12 showing the parts of the indicating mechanism in different operative positions, Fig. 13 illustrating the relation of the parts of the mechanism when the motor is operating at normal temperature, Fig. 14 when the motor temperature is above the normal range, and Fig. 15 when the motor is above normal temperature but is cooling down toward normal temperature.

Referring first to Fig. 1, A designates the steering column of an automobile, the cylinder block of the motor of which is indicated at B. The temperature indicator is designated C and is attached to the steering column A a short distance below the steering wheel D. The indicating mechanism is operated through the expansion of a fluid contained in a capsule E which is preferably fixed to the cylinder block B of the motor so as to project into the water jacket of the motor (Fig. 3), the capsule being connected to the indicating device on the steering column by means of a tube F.

In accordance with the preferred form of the invention herein disclosed, the indicator operates at certain critical temperatures to give the driver three signals or indications as to the running condition of the motor. When the temperature of the motor is below the normal range a green signal is displayed but is unilluminated. While the motor is operating at normal temperatures the green signal is displayed but is illuminated. When the temperature of the motor is above the normal range of working temperatures a red signal is displayed and the illumination is continued.

The indicating member consists of a pivoted oscillating shutter 25 (Fig. 9) formed with two apertures over which are arranged a translucent green light filter 26 and a similar red light filter 27. The movements of the shutter 25 are controlled by means of an expansible member 28, preferably of corrugated configuration, to which extends the tubes F above referred to. The shutter 25, together with the mechanism for giving it its oscillatory movement, and the lamp 29 are enclosed in a casing 30. The expansible member 28 is enclosed in a casing 31 connected with casing 30.

The casing 31 consists of a member 32, a member 33 screwed into the member 32 and having an aperture 34 for the tube F, and a member 35 secured to the top of member 32 by screws 36. Member 35 is formed with an upstanding integral annulus 37 for receiving the flanges 38, 39 of a pair of pressed steel casing members 40, 41 which constitute the casing 30 above referred to, for enclosing the indicating mechanism, flanges 38, 39 being clamped to the annulus 37 by means of a ring 42 and screws 43. The upper casing member 41 (referring to the preferred position of the instrument on the steering column) is formed with an inturned flange 44 having an angularly disposed rim portion 45 against which is arranged a light impervious screen 46 having a central aperture 47 through which the signals are displayed. Arranged over the screen 46 with the interposition of a compressible gasket 48 is a lens or glass disc 49. The screen 46 is preferably flanged at 50 around the gasket and the edge of disc 49 and the parts are held in position by a ring 51 angular in cross section, one flange 52 of which is driven between the inturned flange 44 of the casing and the outturned flange 50 of the screen 46, the other flange 53 of the ring overlapping the disc 49.

The opposite or lower casing member 40 is also formed with an inturned flange of angular cross section, designated 54, against which is placed the flange 55 of a conical reflector 56 having a central aperture 57, and, at its outer edge, an outturned rim portion 58. A lens or glass disc 59 is arranged against a gasket 60 and the parts just mentioned are held in place by means of a compression ring 61.

The inturned flange 44 of the upper casing member 41 is formed with a pair of integrally projecting angular brackets 62, 63 (Fig. 6) to which is secured by bolts 64 an arcuate member 65 to the upper portion of which is fixed a headed stud 66 on which is arranged a sleeve 67 formed with a rib 68. The oscillating shutter 25 is pivoted on the sleeve 67 between its rib 68 and the head 69 of stud 66. A coiled spring 70 (Fig. 10) is mounted on sleeve 67. The spring is provided with two projecting end portions, designated 71 and 72, between which extend a lug 73 cut and bent inwardly from the shutter 25, and a lug 74 on a bell crank lever 75 (Fig. 8) which latter is pivoted by means of a stud 76 (Fig. 12) to one of the extremities of the arcuate support 65. The lower arm 77 of bell crank 75 is connected by a stud 78 with the end of a rod 79 which extends through an aperture 80 in the top of the casing member 35 and is operatively connected, by means to be described, with the hollow expansible member 28, the rod 79 having angular bends 81, 82 to bring its extremity in the plane of the bell crank 75.

The lower end of operating rod 79 is threaded and extends through a flexible diaphragm 83 the edge of which is clamped between casing members 35 and 32, the rod being anchored to the diaphragm by lock nuts 84, 85. The lower extremity of rod 79 has a threaded connection with a stud 86 which is itself threaded into a boss on a core member 87 of the expansible element 28, the latter consisting of this core member, the core member 88 and a flexible corrugated member 89, the flanges 90 of which are soldered to the core members. The core members are hollow and member 88 is apertured at 91. A coiled spring 92 is interposed between a shoulder 93 on the casing member 32 and a shoulder 94 on boss 87. The lower end of the core member 88 is formed with a threaded boss 95 recessed to receive the upper end of tube F which has a soldered connection with the boss 95.

The expansible element 28 is supported in casing 31 by means permitting a variable pressure to be exerted against the under side of the expansible member, said means being as follows: 96 is a bridge the ends 97 of which are secured by screws 98 to the intermediate casing member 32. The bridge is formed with a central threaded aperture 99 in which is an exteriorly threaded sleeve 100 (Fig. 4) the inner surface of which is smooth and which is formed on the bottom with a pair of lugs 101. These lugs are engaged by notches 102 in an adjusting plate 103 (Fig. 5) provided with a finger 104. The sleeve and adjusting plate are supported on boss 95 by a nut 105.

The capsule E at the other end of tube F is formed with a circumferential rib 106 (Fig. 3) and is supported in a bushing 107 screwed into the cylinder block B of the motor, a gland 108 being screwed into the bushing and against flange 106. By this arrangement the bushing may first be fixed to the cylinder block and the capsule E then put in place without twisting or turning it and removed in the same way when necessary.

The shutter 25 is oscillated back and forth to expose either the green light filter 26 or the red light filter 27 through the aperture 47 in screen 46 by means of the bell crank 75 and spring 70 above referred to. The shutter is held in one or the other position, as the case may be, during the intervals between its movements at certain critical temperatures, by means of a latch 109 having a curved lip 110 adapted to engage, at different positions of the shutter 25, one or other of a pair of lugs 111, 112 on the shutter. The latch 109 is pivoted by a stud 113 to one of the extremities of the arcuate supporting plate 65 and is connected by a link 114 to the lower and outer end of the lower arm 77 of bell crank 75.

For illuminating the signaling mechanism the following arrangements are employed: A socket 115 for an electric lamp 116 is supported by a bracket 117 projecting from the interior flange of the lower casing member 40. Secured to the bracket 62 of the upper casing member 41 is a block 118 of insulating material to which is fastened a terminal plate 119 with which the central terminal of the lamp is adapted to contact when the lamp is screwed down through the socket 115, the latter being open at the bottom. On the arcuate supporting member 65 is an insulating block 120 formed with openings therein in which are arranged a pair of terminal plates 121, 122, one of which is shown in detail in Fig. 11, the terminal plates being secured to block 120 by screws 123. 124 is a strip of insulating material on the inner side of the block 120, the block and strip being secured to support 64 by screws 125. A wire 126 extends through an opening 127 in casing member 41, is clipped at 128 to bracket 63 and is connected with the terminal plate 121. A wire 129 is connected with terminal plate 122 and extends to the plate 119 against which the central contact of lamp 116 bears. Bell crank 75 carries an insulating block 130 on which is an arcuate circuit breaking arm 131 adapted to bridge the gap between the downwardly extending legs of the terminal plates 121, 122.

The indicating instrument is detachably fastened to the steering column A by means of a clamping ring 132 (Fig. 12).

*Operation.*—The operation of the indicating device at different critical motor temperatures will be best understood by a comparison of Figs. 12, 13, 14 and 15.

Fig. 12 shows the parts of the mechanism in the positions which they assume when the motor is cold. In this condition of the motor the fluid contained in capsule E is cold and consequently the expansive element 28 is contracted and operating rod 79 is in its lowermost position. The upper end of the bell crank 75 is, therefore, rocked to the right so that, because of the engagement of lug 74 on the bell crank with the end 71 of spring 70, and the engagement of the other end 72 of the spring with the lug 73 on the shutter, the shutter is held in its right hand position so its green light filter 26 is directly back of the sight opening 47 in screen 46. In this position of the bell crank 75 the circuit breaking arm 131 is out of contact with the terminal plate 122 so that no current is supplied to the lamp. The green unilluminated signal indicates that the motor is at a subnormal temperature. As the motor heats up the fluid in capsule E and tube F expands, expanding the element 28 and raising the operating rod 79. This movement of operating rod 79 rocks the bell crank so as to bring arm 131 thereon against the contact plate 122 thereby supplying current to lamp 116. This is calculated so that it takes place when the motor temperature reaches the normal range of operating temperatures. The shutter, however, remains in its right hand position due to the fact that the lip 110 of latch 109 has been moved, by the rocking movement of the bell crank, in front of the lug 111 on the shutter so as to prevent the rocking movement of the bell crank from being accompanied by a corresponding movement of the shutter. The relative position of the parts, so long as the motor operates within its normal range of temperature, is shown in Fig. 13. A green signal is displayed but this signal is illuminated.

If the motor temperature rises to a point above the normal range, the shutter is given an instantaneous oscillatory movement to the left so as to bring the red light filter 27 in line with sight opening 47. Fig. 14 shows the parts of the mechanism in this position. An illuminated red signal is displayed. The movements of the parts from the positions shown in Fig. 13 to the positions shown in Fig. 14 are accomplished as follows: Assuming the shutter to be held in its right hand position by latch 109, the movement of the upper end of the bell crank to the left brings lug 74 on the bell crank against the end 72 of spring 70 so as to put the spring under tension, the tension increasing as the rod 79 rises due to rise of temperature in the cooling fluid of the motor. When the motor temperature passes from the normal to the supernormal range, bell crank 75 has been rocked far enough so that the lip 110 on latch 109 has been raised so as to release lug 111 on the shutter. The stored energy in spring 70 now throws the shutter from right to left. The shutter, it will be observed, oscillates between the inwardly projecting brackets 62, 63 which form stops to limit its oscillatory movements.

Assuming now that the motor begins to cool, the first downward movement of operating rod 79 brings the lip 110 of latch 109 against the lug 112 on the shutter so that a continued downward movement of the operating rod, due to progressive cooling of the motor, does not at first involve any return movement of the shutter. The intention is that the red indication should be maintained until the motor has cooled to a temperature within its normal range. When such temperature is reached the angular movement of the bell crank brings about the release of lug 112 by lip 110 and spring 70 which has been subjected to increasing tension, because of the retention of the shutter and the continued leftward movement of the bell crank, now throws the shutter to the right so as to restore the parts to their positions as shown in Fig. 13. Fig. 15 shows the position of the parts of the mechanism when the motor is operating at a supernormal temperature but approaching the normal range. The end 72 of spring 70 bears against lug 73 on the shutter. The other end 71 of the spring is forced to the right by lug 74 on bell crank 75.

In order to adjust the operation of the indicating mechanism to motors, the normal operating temperatures of which are different, the finger 104 is rotated in one direction or the other to increase or decrease the pressure on the under side of the expansive element 28, thereby making the expansive element quicker or slower to respond to increase of pressure of the heat sensitive fluid in capsule E and tube F. This adjustment may also be made for winter driving, when the use of alcohol in the radiator will change the permissible range of operating temperatures.

During the normal operation of the temperature indicator lamp 116 illuminates the floor of the car because of the provision of the under side of the casing of the indicator with the lens or transparent disc 59.

I claim:
1. In a motor temperature indicator for water cooled automobile motors, the combination of indicating mechanism comprising a lamp, a housing for said mechanism, and means for supporting said housing on the steering column of the automobile; said housing being formed with its under side transparent so that said lamp illuminates the floor portion of the automobile under the dashboard.

2. In a motor temperature indicator for water cooled automobile motors, a housing, means for supporting the housing on the steering column of the automobile, a lamp in said housing, transparent enclosing means for both the top and bottom of said housing, a movable indicator within the housing between the lamp and the transparent top of the housing, and means for directing light rays from the lamp through the transparent bottom of the housing to illuminate the floor portion of the automobile under the dashboard.

3. In a motor temperature indicator, the combination of a movable indicating member, an actuating rod for controlling the movements of the indicating member, a hollow expansive element to one side of which said rod is operatively connected, said expansive element having a shouldered boss on the opposite side thereof, a support having an opening through which said boss extends, a sleeve surrounding said boss and bearing against the shoulder thereof and having a threaded engagement with said support, and means for rotating said sleeve.

CLAYTON A. DUNHAM.